United States Patent
Shao et al.

(10) Patent No.: US 11,574,103 B2
(45) Date of Patent: Feb. 7, 2023

(54) ADDRESSING LAYOUT RETARGETING SHORTFALLS

(71) Applicant: International Business Machines Corporation, Armonk, NY (US)

(72) Inventors: Dongbing Shao, Wappingers Falls, NY (US); Rasit Onur Topaloglu, Poughkeepsie, NY (US); Geng Han, Albany, NY (US); Yuping Cui, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/779,179

(22) Filed: Jan. 31, 2020

(65) Prior Publication Data
US 2021/0240899 A1    Aug. 5, 2021

(51) Int. Cl.
G06F 30/392 (2020.01)
G06F 30/398 (2020.01)
G06F 119/18 (2020.01)

(52) U.S. Cl.
CPC .......... G06F 30/392 (2020.01); G06F 30/398 (2020.01); G06F 2119/18 (2020.01)

(58) Field of Classification Search
CPC .. G06F 30/392; G06F 30/398; G06F 2119/18; G06F 30/39; Y02P 90/02
See application file for complete search history.

(56) References Cited

U.S. PATENT DOCUMENTS

| | | | | |
|---|---|---|---|---|
| 7,043,712 B2 * | 5/2006 | Mukherjee | ............... | G03F 1/36 716/52 |
| 7,512,927 B2 * | 3/2009 | Gallatin | ............... | G03F 1/36 716/51 |
| 7,624,369 B2 | 11/2009 | Graur et al. | | |
| 7,784,019 B1 * | 8/2010 | Zach | ............... | G06F 30/39 716/53 |
| 8,103,981 B2 | 1/2012 | Kahng et al. | | |

(Continued)

OTHER PUBLICATIONS

Banerjee et al.; "Electrically driven optical proximity correction based on linear programming"; 2008 IEEE/ACM International Conference on Computer-Aided Design; Conference Paper | Publisher: IEEE (Year: 2008).*

(Continued)

Primary Examiner — Helen Rossoshek
(74) Attorney, Agent, or Firm — Samuel Waldbaum; Otterstedt & Kammer PLLC

(57) ABSTRACT

Aspects of the invention provide means for addressing layout retargeting shortfalls. Initially, an original design shape in the layout is allowed to be simulated by process simulation to form process simulation contours. A polygon is then fitted to the process simulation contours to form a fitted simulated shape. Subsequently, whether the fitted simulated shape differs from the original design shape is detected. The process simulation may reflect the changes to the layout that occur at a foundry as part of a retargeting process. Advantageously, addressing a layout for retargeting shortfalls in accordance with aspects of the invention is likely to result in manufactured semiconductor devices having higher yields and reliability than those produced from a like layout that is not addressed in this manner.

13 Claims, 9 Drawing Sheets

(56) References Cited

U.S. PATENT DOCUMENTS

| | | | | |
|---|---|---|---|---|
| 8,372,565 B2* | 2/2013 | Tian | ............ | G03F 1/70 |
| | | | | 430/30 |
| 8,392,871 B2* | 3/2013 | Mansfield | ............ | G03F 7/203 |
| | | | | 716/139 |
| 8,793,627 B1* | 7/2014 | Stephens | ............ | G06F 30/398 |
| | | | | 716/52 |
| 8,799,830 B2* | 8/2014 | Robles | ............ | G06F 30/367 |
| | | | | 716/51 |
| 8,930,858 B1 | 1/2015 | Kuo et al. | | |
| 8,942,464 B2* | 1/2015 | Shibahara | ............ | G01B 21/20 |
| | | | | 382/145 |
| 9,910,348 B2* | 3/2018 | Han | ............ | G03F 1/36 |
| 10,210,295 B2* | 2/2019 | Rosenbluth | ............ | G06F 30/367 |
| 10,216,890 B2 | 2/2019 | Qian | | |
| 10,539,881 B1* | 1/2020 | Sha | ............ | G06F 30/27 |
| 2006/0041851 A1* | 2/2006 | Gallatin | ............ | G03F 1/68 |
| | | | | 716/53 |
| 2008/0115096 A1* | 5/2008 | Pikus | ............ | G06F 30/398 |
| | | | | 716/52 |
| 2009/0300561 A1 | 12/2009 | Tong et al. | | |
| 2011/0145770 A1* | 6/2011 | Brooks | ............ | G06F 30/398 |
| | | | | 716/102 |
| 2011/0202893 A1* | 8/2011 | Kusnadi | ............ | G03F 1/70 |
| | | | | 716/53 |
| 2019/0072845 A1 | 3/2019 | Lin et al. | | |
| 2019/0294039 A1* | 9/2019 | Lin | ............ | G03F 1/38 |
| 2019/0311071 A1* | 10/2019 | Liu | ............ | G06F 7/58 |

OTHER PUBLICATIONS

Duckham et al., "Efficient generation of simple polygons for characterizing the shape of a set of points in the plane," Pattern Recognition, vol. 41, No. 10, 2008, pp. 3224-3236.

Moreira et al., "Concave hull: A k-nearest neighbours approach for the computation of the region occupied by a set of points," International Conference on Computer Graphics Theory and Applications, 2007, pp. 61-68.

Levcopoulos et al., "Approximation algorithms for covering polygons with squares and similar problems," In International Workshop on Randomization and Approximation Techniques in Computer Science, 1997, pp. 27-41.

Futatsuya et al., "Development of a lithographic DRC technique for interactive use and batch processing," Proc. SPIE 3679, 1999, pp. 659-665.

* cited by examiner

ADDRESSING LAYOUT RETARGETING SHORTFALLS

BACKGROUND

The present invention relates to the electrical, electronic, and computer arts, and, more particularly, to methods and apparatus for detecting and addressing adverse modifications to a semiconductor device layout from layout retargeting.

Before a given semiconductor device layout is sent to a foundry (i.e., a semiconductor fabrication plant or fab) for manufacture, a design company (e.g., a fabless semiconductor company) will typically perform extensive design rule checking (DRC) on the layout. The design rules specify certain geometric and connectivity restrictions to ensure sufficient margins in order to account for variability in semiconductor manufacturing processes. DRC enhances yield by ensuring that there are sufficient margins in the layout to accommodate this variability.

However, once a semiconductor device layout is sent to a foundry for manufacture, it is subject to more modifications. A foundry will frequently apply an automatic update to a layout after its receipt (i.e., they will "retarget" the layout) in order to improve the printability of the layout and to optimize the process window for their particular manufacturing processes. The retargeting codes are typically not shared with the design company because of the foundry's interest in maintaining confidentiality about its processes and their limitations. Accordingly, a layout gets modified without notice to the design company, and there tends to be very little additional DRC after the retargeting. That is, DRC occurs on design shapes rather than on retargeted shapes. If the retargeting fails to consider all layout complexities, then the retargeted layout is subject to failure or low yields. When such issues arise due to retargeting, they are often hard to debug because of a lack of documentation and the complexity of the conditions that cause retargeting.

As one example, retargeting at a foundry may act to change the dimensions of a metal feature that is used as a hard mask in a self-aligned-via (SAV) process without regard for the fact that the size of the via will follow the change in dimensions of the retargeted metal feature. The resultant via may subsequently break design rules related to edge spacing from other features. The retargeting may thereby inadvertently impact yield and/or performance despite the fact that the prior DRC showed no such issues.

There is, as a result, a need for methods and apparatus for checking modifications to a layout resulting from retargeting, and modifying the layout to accommodate those modifications where necessary to address layout retargeting shortfalls.

SUMMARY

Embodiments in accordance with aspects of the invention provide methods and apparatus for detecting and addressing adverse modifications to a semiconductor device layout from retargeting at, for example, a foundry.

Aspects of the invention provide a method of addressing layout retargeting shortfalls. An original design shape in the layout is allowed to be simulated by process simulation to form process simulation contours. A polygon is then fitted to the process simulation contours to form a fitted simulated shape. Subsequently, whether the fitted simulated shape differs from the original design shape is detected.

Additional aspects of the invention are directed to a computer program product for addressing layout retargeting shortfalls. The computer program product comprises a computer readable storage medium having program instructions embodied therewith. The program instructions are executable by a processor to cause the processor to: (1) allow an original design shape in the layout to be simulated by process simulation to form process simulation contours; (2) fit a polygon to the process simulation contours to form a fitted simulated shape; and (3) detect whether the fitted simulated shape differs from the original design shape.

Even additional aspects of the invention are directed to an apparatus for addressing layout retargeting shortfalls. The apparatus comprises a memory and at least one processor coupled to the memory. The at least one processor is operative to perform the steps of: (1) allowing an original design shape in the layout to be simulated by process simulation to form process simulation contours; (2) fitting a polygon to the process simulation contours to form a fitted simulated shape; and (3) detecting whether the fitted simulated shape differs from the original design shape.

Advantageously, addressing a layout for retargeting shortfalls in accordance with aspects of the invention is more likely to result in manufactured semiconductor devices having higher yields and reliability than those produced from a like layout that is not addressed in this manner.

BRIEF DESCRIPTION OF THE DRAWINGS

These and other features, aspects, and advantages of the present invention will become better understood with regard to the following description, appended claims, and accompanying drawings where:

DETAILED DESCRIPTION

The present invention will be described with reference to illustrative embodiments. For this reason, numerous modifications can be made to these embodiments and the results will still come within the scope of the invention. No limitations with respect to the specific embodiments described herein are intended or should be inferred.

As described in the Background, it is commonplace for a foundry to apply an automatic retargeting code to a received semiconductor device layout in order to improve the printability of the layout and to optimize the process window for the foundry's particular manufacturing processes. The retargeting codes are typically not shared with the organization submitting the semiconductor device layout because of the foundry's interest in maintaining confidentiality about its processes and their limitations. Nevertheless, if the retargeting fails to consider all layout complexities, then the retargeted layout is subject to failure or low yields. Embodiments of methods and apparatus provide techniques for the design company to check the modifications to a layout resulting from retargeting, and to modify the layout to accommodate those modifications where necessary.

Figure 1:
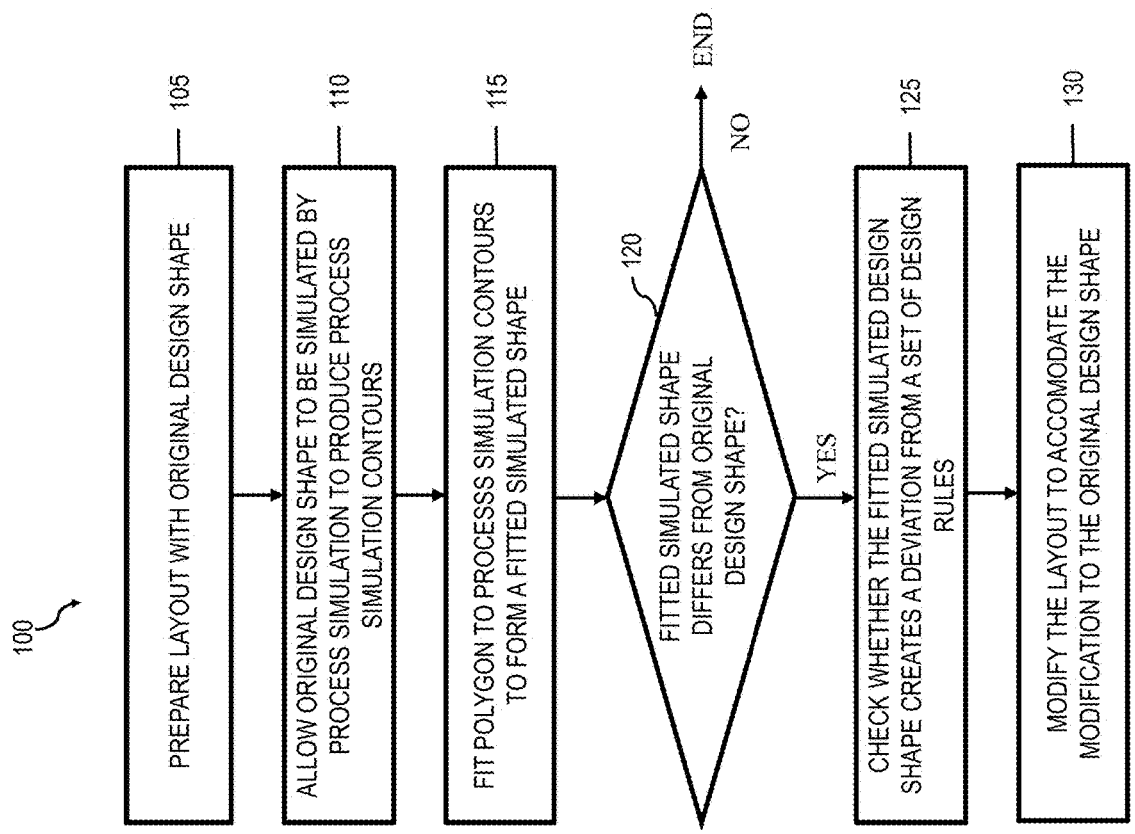
FIG. 1 shows a flow diagram of a method of performing post-retargeting layout modifications in accordance with an illustrative embodiment of the invention.

FIG. 1 shows a flow diagram of a method 100 for performing post-retargeting layout modifications in accordance with an illustrative embodiment of the invention. The method 100 is contemplated as being performed by a design organization intending to ultimately send a layout to a foundry for manufacture. In describing the method 100, reference is made to a single, particular design shape in the layout for both clarity and ease of understanding. However, when actually reduced to practice, it is contemplated that a plurality of different design shapes (possibly many thousands) will be considered when performing the method 100.

In step 105 of the method 100, the design organization prepares a layout that includes an original design shape. In so doing, the design organization performs DRC on the layout to determine if there any violations of width, length, spacing, density, enclosure, area, etc., that may cause yield or reliability issues in a manufactured product. Such DRC is commonplace in semiconductor manufacturing and will be familiar to one having ordinary skill in the relevant arts. DRC is also described in a number of readily available references, including, for example, M. Birnbaum, *Essential Electronic Design Automation (EDA)*, Prentice Hall Professional, 2004.

Next, in step 110, the layout (or some smaller portion thereof) is submitted to the foundry and the foundry is allowed to modify the layout by process simulation reflecting their retargeting code and any other modifications that they may normally make to a layout when accepting the layout for manufacture (e.g., optical proximity correction (OPC)). In so doing, it is anticipated that the original design shape will be simulated to form process simulation contours in the place of the original design shape. In one or more situations, for example, the shape of the original design shape may be modified during the process simulation (e.g., one or more corners of the original design shape may be rounded or otherwise changed). In other situations, the size of the original design shape may be modified during the process simulation (e.g., the width and/or length of the original design shape may be modified). In either case, in performing the method 100, it is contemplated that the design organization will not be aware of the details of the retargeting code given the proprietary nature of that code.

It is noted that, in step 110, the design organization need not necessarily submit an entire layout to the foundry for process simulation, but may, instead, submit some sub-portion of a real layout or even a specially designed test layout to the foundry in order to explore the effects of retargeting and other changes made by the foundry. Reducing the submitted layout in this manner has the effect of focusing the study on particular levels and/or features, and also has the benefit of reducing the computational resources needed for execution of the method 100.

In step 115, the design organization receives the process simulation contours back from the foundry and then performs a novel fitting method on the process simulation contours. More particularly, in step 115, the design organization fits a polygon to the process simulation contours to form what will hereinafter be called a fitted simulated shape. The simple polygon fit will help to facilitate future steps in the method, as will be discussed below.

Figure 2:
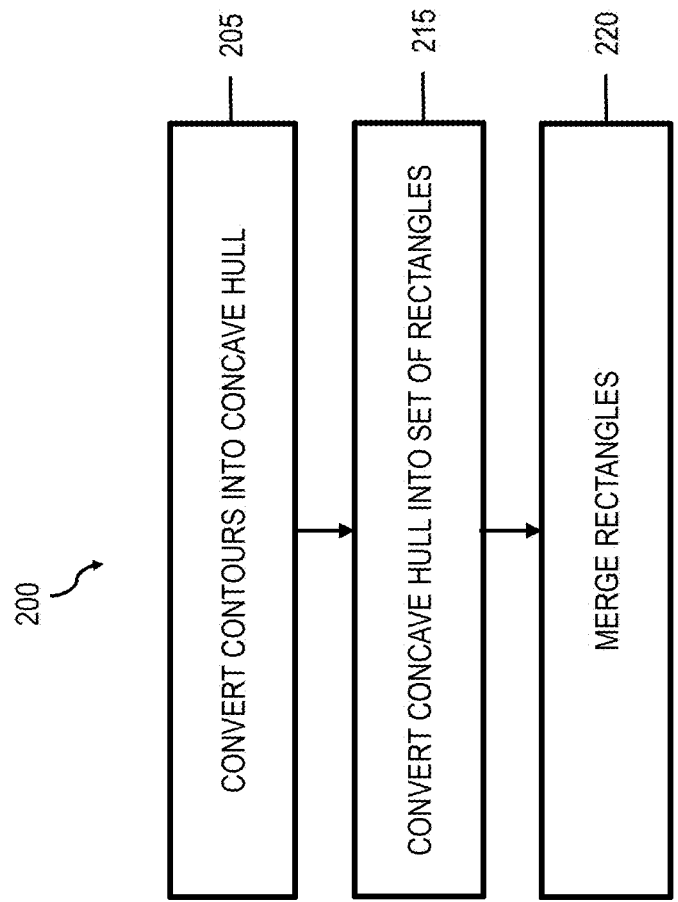
FIG. 2 shows a flow diagram of a method for fitting process simulation contours in the FIG. 1 method.

Several different means of fitting a polygon to the process simulation contours in step 115 will be familiar to one having ordinary skill in the relevant arts, and any such means will fall within the scope of the present invention. FIG. 2 shows a flow diagram of one such method 200 in accordance with aspects of the invention. In step 205 of the method 200, the process simulation contours are converted into a concave hull that characterizes the process simulation contours. Next, in step 215, the concave hull is converted into a set of rectangles that characterize the concave hull. For purposes of this description and the appended claims, a "rectangle" encompasses any shape with four sides and four right angles, and includes squares. Finally, in step 220, the set of rectangles are merged to form the polygon that characterizes the process simulation contours and now forms the fitted simulated shape.

Figure 3:
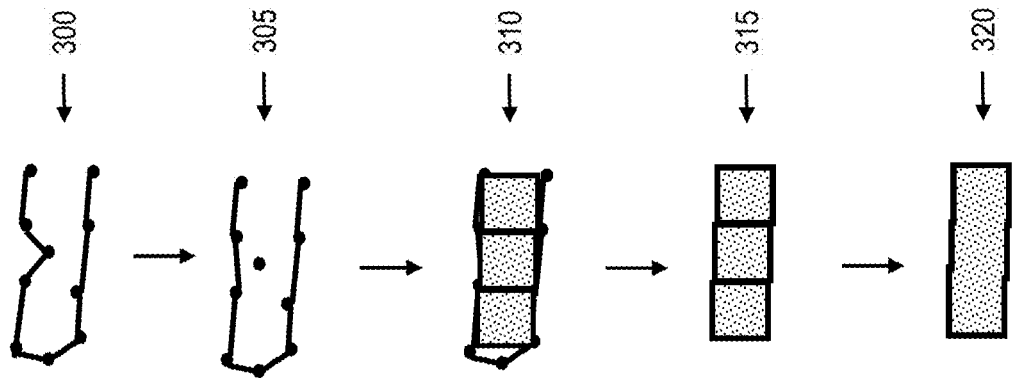
FIG. 3 shows a graphical representation of a fitting sequence by the FIG. 2 method.

A graphical representation of the fitting sequence described by the method 200 in FIG. 2 is shown in FIG. 3. At sequence position 300, complex process simulation contours are presented. Then, at sequence position 305, the process simulation contours are converted into a concave hull in accordance with step 205. At sequence positions 310 and 315, the concave hull is converted into a set of rectangles in accordance with step 215. Finally, at sequence position 320, the rectangles are merged to form a polygon representative of the process simulation contours in accordance with step 220 of the method 200.

The conversion of a complex set of contours into a polygon with or without using a concave hull are described in a number of readily available publications including, for example: M. Duckham et al., "Efficient generation of simple polygons for characterizing the shape of a set of points in the plane," Pattern Recognition, Vol. 41(10), pp. 3224-3236, October 2008; Moreira, et al. "Concave hull: A k-nearest neighbours approach for the computation of the region occupied by a set of points," GRAPP 2007—International Conference on Computer Graphics Theory and Applications, pp. 61-68, 2007; Levcopoulos et al., "Approximation algorithms for covering polygons with squares and similar problems, In: Rolim J. (eds.) Randomization and Approximation Techniques in Computer Science, RANDOM 1997, Lecture Notes in Computer Science, Vol 1269, pp. 27-41, 1997.

Now again referring back to method 100 in FIG. 1, step 120 compares the fitted simulated shape to the original design shape to detect whether the fitted simulated shape deviates from the original design shape. In one or more embodiments, for example, differences in design shapes can be determined by comparing the two shapes using a NOT or an XOR Boolean operation. When using an XOR operation, a pre-determined threshold difference (in, e.g., nanometers or sub-nanometers) may be utilized to control whether a difference is deemed large enough to require further analysis or may be ignored as inconsequential. Assuming that the fitted simulated shape does in fact deviate significantly from the original design shape at step 120, the method 100 moves on to step 125. Alternatively, if there is no deviation detected in step 120, the method 100 ends for that particular original design shape since it is understood that any modifications that the foundry made to the original design shape as part of their layout processing were inconsequential.

Step 125 of the method then performs DRC on the fitted simulated shape to check whether the fitted design shape creates a deviation from the design rules, and, where necessary, modifies the original layout (and other layouts going forward) in step 130 to accommodate any violations of the design rules that are deemed to affect yield or reliability. Such DRC and modifications will preferably consider the level that the original design shape occupies as well as any other levels that may be affected by changes to the size and/or shape of the original design shape. For example, if the original design shape forms a metal feature that acts as a mask for an underlying via in a SAV process, then changing the size or shape of the metal feature during retargeting will also change the size or shape of its underlying via. After the size of a metal feature is increased, its underlying self-aligned via may come too close to another feature and violate an SAV edge-space rule. Accordingly, the metal feature, the via, or both features may violate the design rules after the metal feature is retargeted, and these possibilities are preferably addressed in step 125.

Modification of the layout in step 130 may include any number of changes to the layout to accommodate the retargeting. Changes may include, for example, changes to size, shape, or location of one or more features in the layout. If, as just one example, the retargeting is found to move a feature too close to another, one or the other feature may be shifted away by a determined amount to address the violation. As well as the design rules, engineering judgment may help to determine what modifications to make. Engineering judgment may, for example, determine that some design slack exists that allows a design rule to be violated to some degree or the other. The modified layout from step 130, or a different layout that depends on the knowledge gained from performing the method 100, may then be fabricated by the foundry with the resultant gains in yield and reliability.

Figure 4:
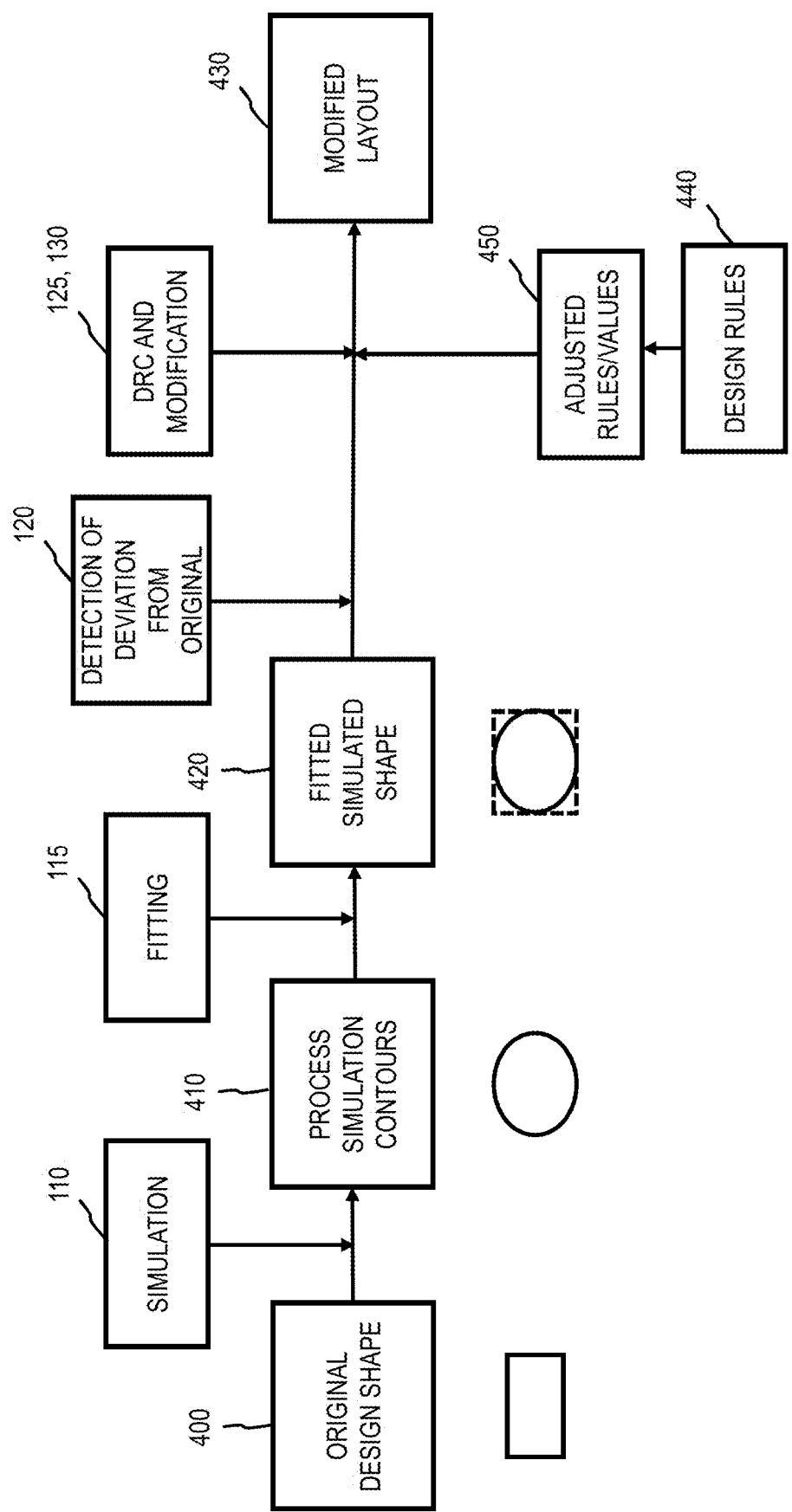
FIG. 4 shows a block diagram further describing aspects of the FIG. 1 method.

FIG. 4 shows a block diagram that helps to further illustrate the method 100 in FIG. 1 by showing the inputs and outputs of the various steps in the method 100. FIG. 4 also shows some illustrative design shapes below blocks 400-420 to show how the shapes evolve during the processing. At block 400, one has the original design shape in accordance with step 105. One then performs process simulation in accordance with step 110 to achieve the process simulation contours in block 410. Subsequently, one fits a polygon to the process simulation contours in accordance with step 115 (by, e.g., the method 200) to achieve the fitted simulated shape in block 420. Deviation of the fitted simulated shape from the original design shape is then detected in accordance with step 120, and if deviation exists, the fitted simulated shape is subjected to DRC in accordance with step 125. Based at least in part on the DRC, the layout is modified in accordance with step 130 to produce the modified layout in block 430. Both design rules (block 440) as well as adjusted rules/values based on engineering judgment (block 450) are inputted into the DRC and modifying steps in accordance with steps 125, 130 to achieve the modified layout in block 430. The method 100 can be repeated several times if desired. As indicated above, an additional step of actually manufacturing a product from the modified layout may follow.

Heretofore, changes introduced into a design by a foundry have typically been hidden from the design house. One or more embodiments permit ready extraction of these changes for review by the design house and/or the foundry. The design house may discover, for example, that changes introduced by the foundry to adapt the design house's layout to the foundry's processes are causing an issue. The design house may provide feedback to the foundry to modify the introduced changes.

Figure 5:
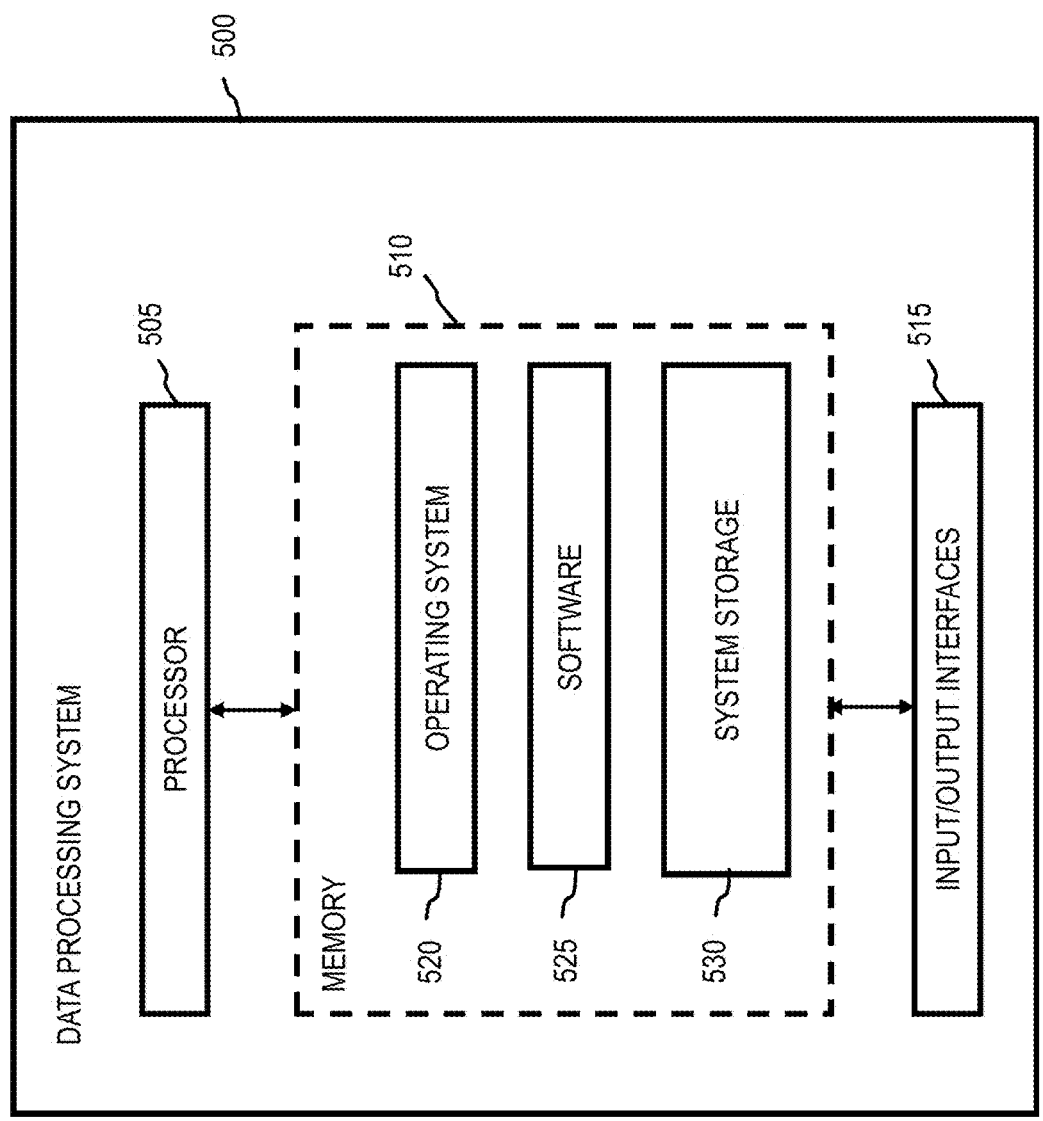
FIG. 5 depicts a block diagram of an illustrative data processing system for use in implementing the FIG. 1 method.

One or more embodiments of the invention, or elements thereof, can be implemented in the form of an apparatus including a memory and at least one data processor (i.e., a form of logic circuitry) that is coupled to the memory and operative to perform the exemplary method steps in FIG. 1. FIG. 5 depicts a data processing system 500 that may be useful in implementing one or more aspects and/or elements of the invention.

The data processing system 500 includes a processor 505, a memory 510, and input/output interfaces 515. Each of these elements is interconnected with the others. The term "processor" as used herein is intended to include any processing device, such as, for example, one that includes a CPU (central processing unit) and/or other forms of logic circuitry. Further, the term "processor" may refer to more than one individual processor. The term "memory" is intended to include memory associated with a processor or CPU, such as, for example, RAM (random access memory), ROM (read only memory), a fixed memory device (e.g., hard drive), a removable memory device (e.g., diskette), a flash memory, and the like. In addition, the phrase "input/output interface" as used herein, is intended to contemplate an interface to, for example, one or more mechanisms for inputting data to the processing unit (e.g., mouse), and one or more mechanisms for providing results associated with the processing unit (e.g., printer). An input/output interface may also include a network interface.

Data processing system 500 may be in many different forms including, as just a few examples, a personal computer system, a server computer system, a thin client, a thick client, a handheld or laptop device, a multiprocessor system, a microprocessor-based system, a set top box, a programmable consumer electronic, a network PC, a minicomputer system, a mainframe computer systems, and a distributed cloud computing environment that include any of the above systems or devices, and the like.

The memory 510 includes an operating system 520, software 525, and system storage 530, which may be computer readable storage media. The operating system 520 and software 525 comprise sets of computer readable program instructions that are executable by the processor 505. The computer readable program instructions are stored on a computer readable storage medium (or media).

Figure 6:
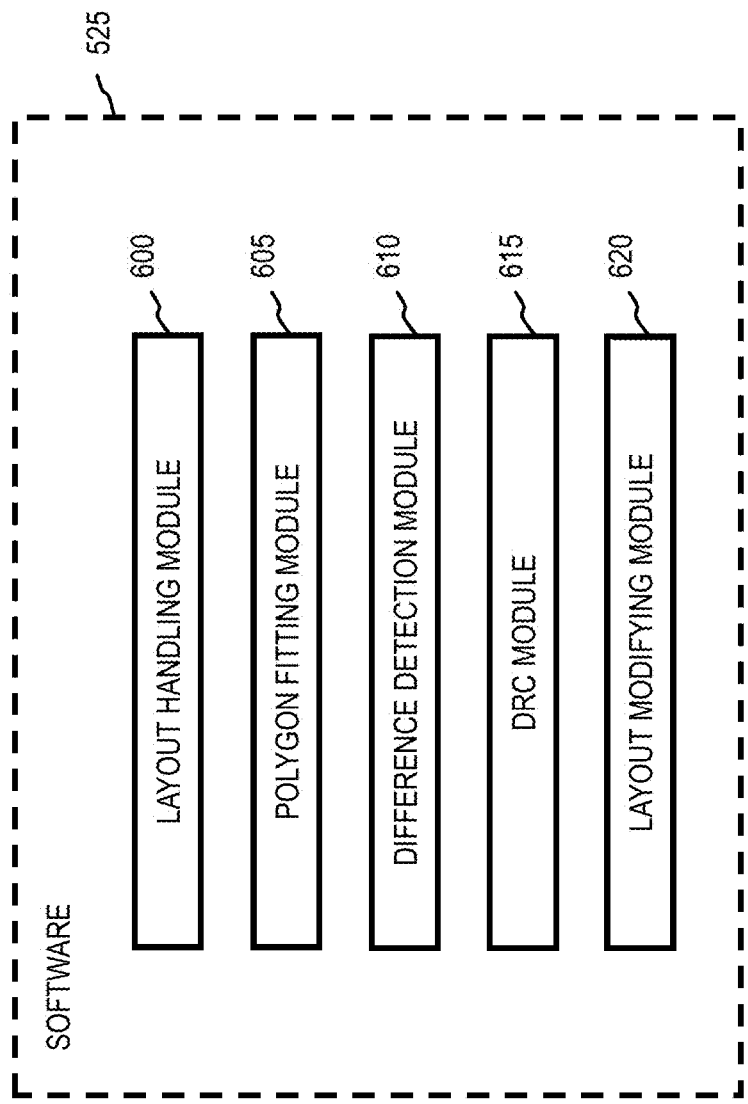
FIG. 6 shows a block diagram of several software modules in the FIG. 5 data processing system.

In one or more embodiments, the software 525 in the memory 510 includes several distinct software modules of instructions that, when executed by the processor 505, are configured to carry out the functions of embodiments of the invention. FIG. 6 shows several of the modules within the software 525 including: a layout handling module 600, a polygon fitting module 605, a difference detection module 610, a DRC module 615, and a layout modification module 620. In one or more embodiments, the layout handling module 600 causes the processor 505 to perform step 105 in the method 100 (FIG. 1)(in a non-limiting example, module 600 is implemented as a pre-processor), while the polygon fitting module 605 causes the processor 505 to perform step 115. Subsequently, the difference detection module 610 causes the processor 505 to perform step 120, while the DRC module 615 causes the processor 505 to perform step 125. Lastly, the modification module causes the processor 505 to perform step 130 in the method 100. The modules can be implemented, for example, by high-level code that encodes the logic disclosed herein and is then compiled or interpreted into computer-executable instructions. Other embodiments could architect the software differently (e.g. more or fewer modules or a single program not in modular format).

In one or more embodiments, for example, the instructions in the software modules 600, 605, 610, 615, 620 may be constructed in high-level source code using a high-level programming language such as, as just a few examples, C, Python, or C++. The high-level source code may then be compiled by a software compiler into a low-level object code in machine language that may be executed by the processor 505 when performing the steps 105, 110, 115, 120, 125, 130 of the method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state "means for" performing a specified function or "step for" performing a specified function is not to be interpreted as a "means for" or "step for" clause as specified in AIA 35 U.S.C. § 112(f). In particular, the use of "steps of" in the claims herein is not intended to invoke the provisions of AIA 35 U.S.C. § 112(f).

Accordingly, in one or more embodiments, the layout is instantiated as a design structure. See discussion of FIG. 8. A physical integrated circuit is then fabricated in accordance with the design structure. See again discussion of FIG. 8. Refer also to FIG. 9. Once the physical design data is obtained, based, in part, on the analytical processes described herein, an integrated circuit designed in accordance therewith can be fabricated according to known processes that are generally described with reference to FIG. 9. Generally, a wafer with multiple copies of the final design is fabricated and cut (i.e., diced) such that each die is one copy of the integrated circuit. At block 3010, the processes include fabricating masks for lithography based on the finalized physical layout. At block 3020, fabricating the wafer includes using the masks to perform photolithography and etching. Once the wafer is diced, testing and sorting each die is performed at 3030 to filter out any faulty die.

Figure 10:
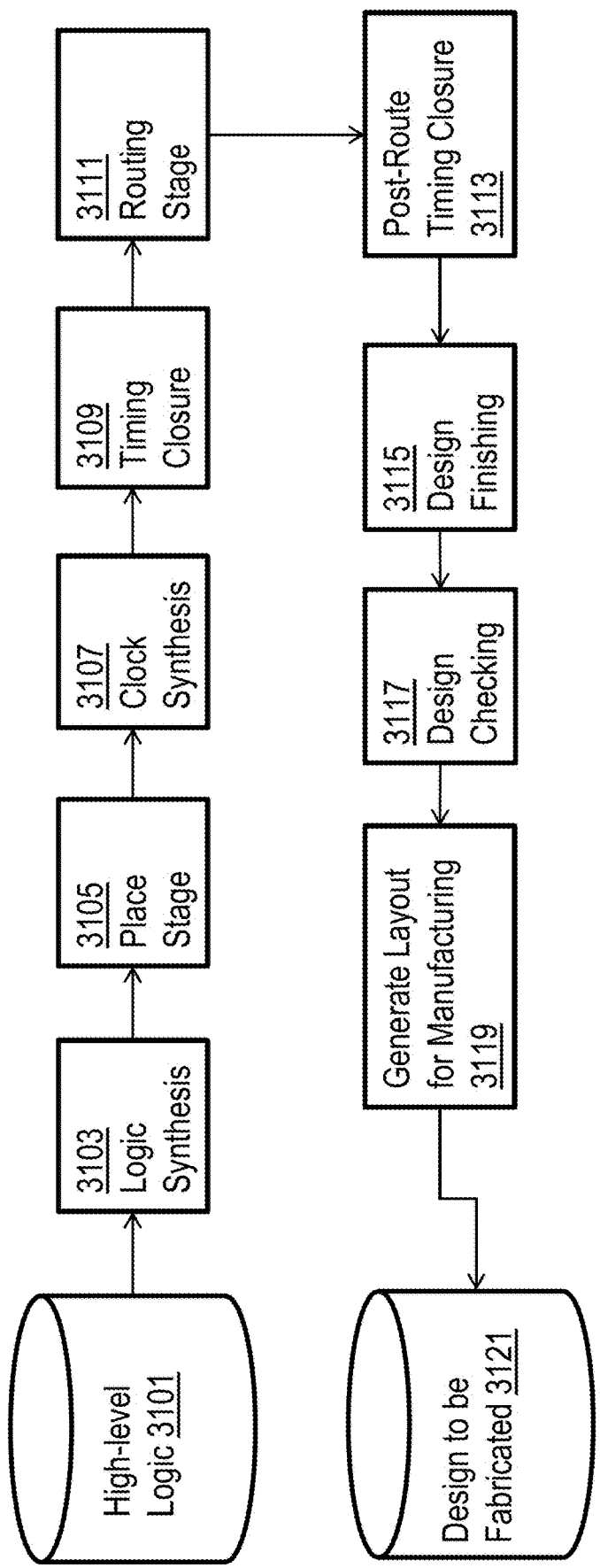
FIG. 10 shows an exemplary high-level Electronic Design Automation (EDA) tool flow, in connection with which aspects of the invention can be employed.

One or more embodiments include a computer including a memory 28; and at least one processor 16, coupled to the memory, and operative to carry out or otherwise facilitate any one, some, or all of the method steps described herein (as depicted in FIG. 10). In one or more embodiments, the performance of this computer is improved, for example, by reducing the required number of CPU cycles by enabling a physical design (PD) team to iterate on multiple design hierarchies without need for logic support, and/or enabling alternate floorplan evaluation (physical design exploration).

Figure 8:
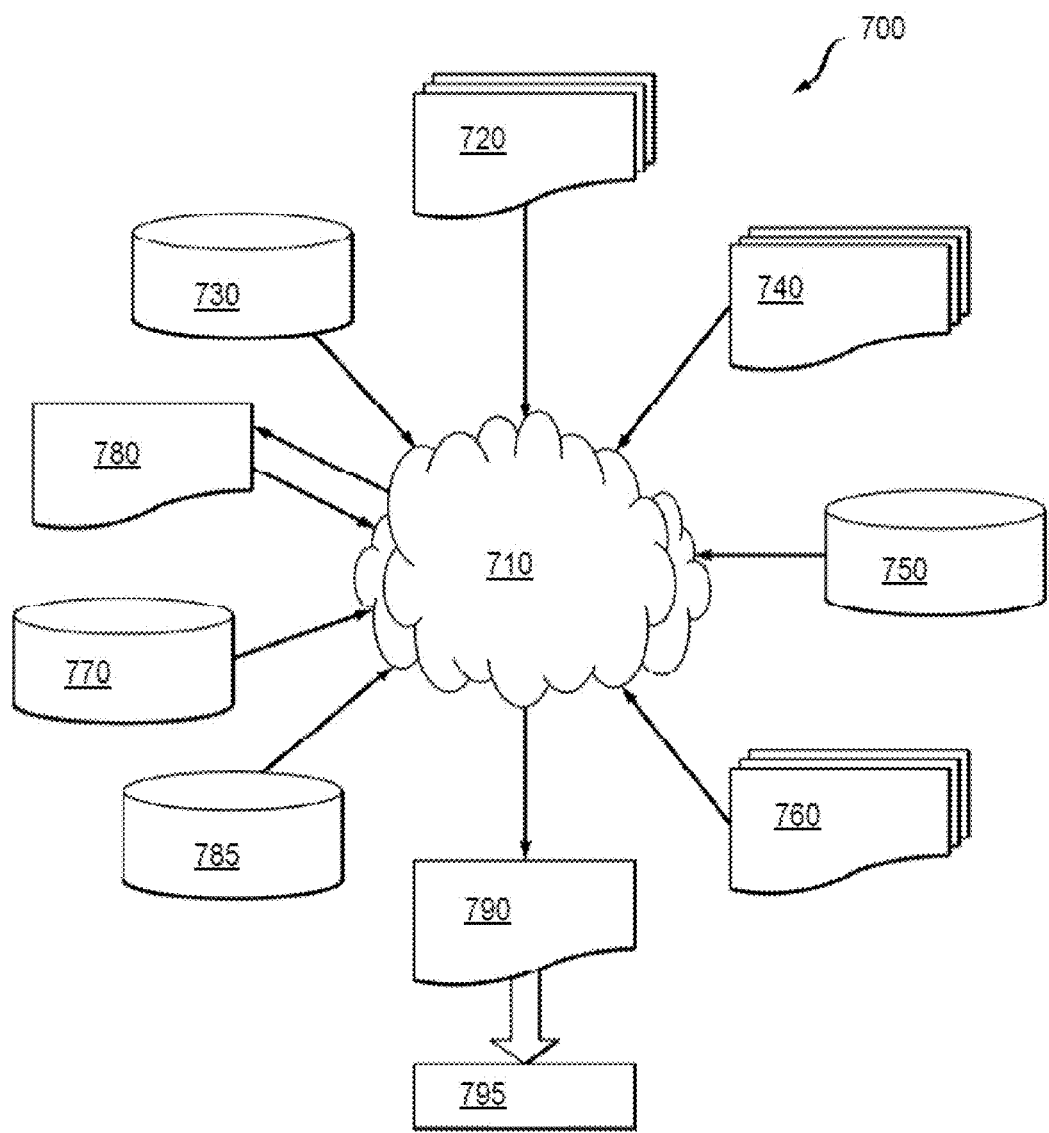
FIG. 8 is a flow diagram of a design process used in semiconductor design, manufacture, and/or test.
Figure 9:
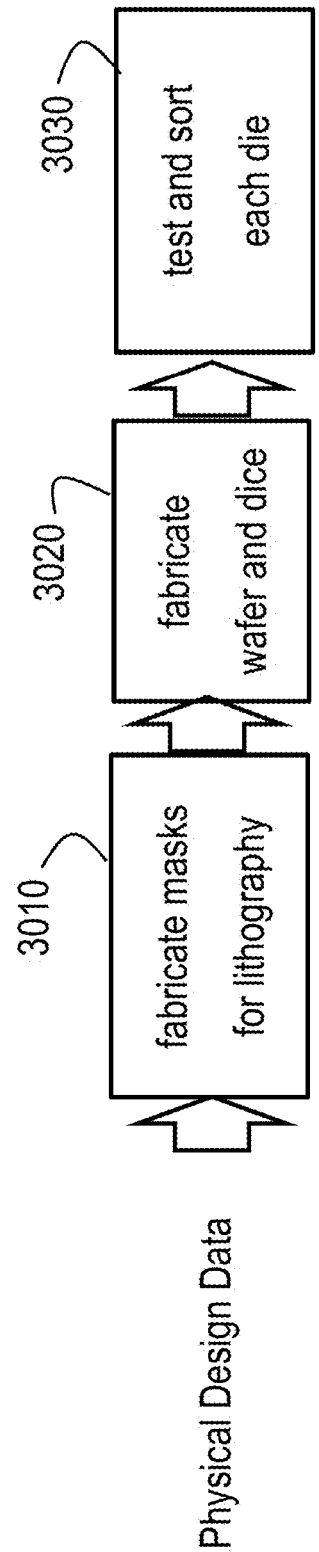
FIG. 9 shows further aspects of IC fabrication from physical design data.

Furthermore, referring to FIG. 8, in one or more embodiments the at least one processor is operative to generate a design structure for the circuit design in accordance with the analysis, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure. The physical integrated circuit will be improved (for example, because of enablement of power reduction through area reduction).

FIG. 10 depicts an example high-level Electronic Design Automation (EDA) tool flow, which is responsible for creating an optimized microprocessor (or other IC) design to be manufactured. A designer could start with a high-level logic description 3101 of the circuit (e.g. VHDL or Verilog). The logic synthesis tool 3103 compiles the logic, and optimizes it without any sense of its physical representation, and with estimated timing information. The placement tool 3105 takes the logical description and places each component, looking to minimize congestion in each area of the design. The clock synthesis tool 3107 optimizes the clock tree network by cloning/balancing/buffering the latches or registers. The timing closure step 3109 performs a number of optimizations on the design, including buffering, wire tuning, and circuit repowering; its goal is to produce a design which is routable, without timing violations, and without excess power consumption. The routing stage 3111 takes the placed/optimized design, and determines how to create wires to connect all of the components, without causing manufacturing violations. Post-route timing closure 3113 performs another set of optimizations to resolve any violations that are remaining after the routing. Design finishing 3115 then adds extra metal shapes to the netlist, to conform with manufacturing requirements. The checking steps 3117 analyze whether the design is violating any requirements such as manufacturing, timing, power, electromigration (e.g., using techniques disclosed herein) or noise. When the design is clean, the final step 3119 is to generate a layout for the design, representing all the shapes to be fabricated in the design to be fabricated 3121.

Figure 7:
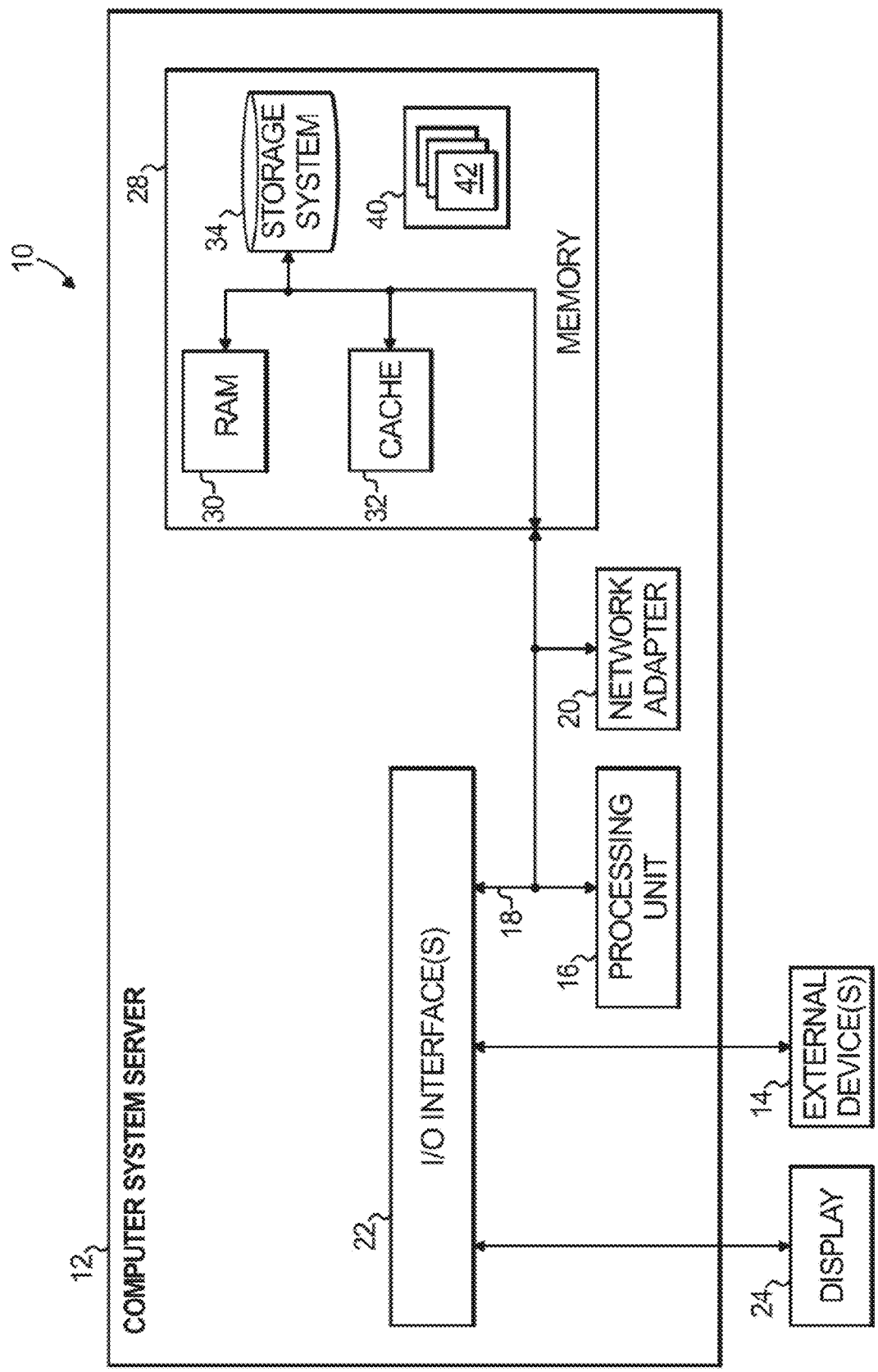
FIG. 7 depicts a computer system that may be useful in implementing one or more aspects and/or elements of the invention.

One or more embodiments of the invention, or elements thereof, can be implemented in the form of an apparatus including a memory and at least one processor that is coupled to the memory and operative to perform exemplary method steps. FIG. 7 depicts a computer system that may be useful in implementing one or more aspects and/or elements of the invention; it is referred to herein as a cloud computing node but is also representative of a server, general purpose-computer, etc. which may be provided in a cloud or locally.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system (see, e.g., FIGS. 5 and 6). Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 7, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks.

Modems, cable modem and Ethernet cards are just a few of the currently available types of network adapters.

As used herein, including the claims, a "server" includes a physical data processing system (for example, system 12 as shown in FIG. 7) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary Design Process Used in Semiconductor Design, Manufacture, and/or Test

One or more embodiments integrate the characterizing and simulating techniques herein with semiconductor integrated circuit design simulation, test, layout, and/or manufacture. In this regard, FIG. 8 shows a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of design structures and/or devices, such as those that can be analyzed using techniques disclosed herein or the like. The design structures processed and/or generated by design flow 700 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 8 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a gate array or storage medium or the like, design structure 720 may be accessed and processed by one or more hardware and/or software modules within design process 710 to simulate or otherwise functionally represent an electronic component, circuit, electronic or logic module, apparatus, device, or system. As such, design structure 720 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of components, circuits, devices, or logic structures to generate a Netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 710 may include hardware and software modules for processing a variety of input data structure types including Netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc. Improved latch tree synthesis can be performed as described herein.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 790 may comprise a compiled, executable HDL simulation model that functionally simulates the devices to be analyzed.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 790 may then proceed to a stage 795 where, for example, design structure 790: proceeds to tape-out, is released to manufacturing, is released to a mask house, is sent to another design house, is sent back to the customer, etc. In some instances, the following flow occurs: design house tape-out foundry tape-out (retargeting can happen here) mask shop manufacturing. A design house can be a company without foundry capability; a mask shop can be a third company, different than the foundry and design house. Manufacturing is also handled at the foundry that does the retargeting, in one or more embodiments. Before the foundry tapes out, the design house may sometimes get a chance to review retargeting and react with an updated tape-out. This may be handled by smaller circuit blocks that were sent to the foundry for analysis before either tape-out. It may also happen, in some cases, if tape-out is staggered across various layers of the chip. Staggering occurs, for example, where only a few layers are taped-out while others are still being worked on and are thus subject to update if pertinent retargeting issues are known.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising the steps of:
    using, using at least one processor, an original design shape in a layout to be simulated by process simulation to form process simulation contours;
    fitting, using the at least one processor, a polygon to the process simulation contours to form a fitted simulated shape;
    comparing, using the at least one processor, the fitted simulated shape and the original design shape; and
    determining, using the at least one processor, whether the fitted simulated shape violates a set of design rules in response to detecting that the fitted simulated shape differs from the original design shape, wherein the fitting step comprises generating a concave hull that characterizes the process simulation contours, fitting a plurality of rectangles to the concave hull and merging the plurality of rectangles to form the polygon.

2. The method of claim 1, wherein the comparing step comprises comparing the fitted simulated shape to the original design shape utilizing a NOT or an XOR Boolean operation.

3. The method of claim 1, wherein the determining step comprises determining at least one of width, length, spacing, density, enclosure, or area of the fitted simulated shape.

4. The method of claim 1, further comprising the step of modifying the layout if the fitted simulated shape violates the set of design rules.

5. The method of claim 4, wherein the modifying step comprises modifying at least one of size, shape, or position of the original design shape.

6. The method of claim 4, further comprising the step of manufacturing a semiconductor device based on the modified layout.

7. The method of claim 1, further comprising providing a system, wherein the system comprises distinct software modules, each of the distinct software modules being embodied on a computer readable storage medium, and wherein:
    the distinct software modules comprise a polygon fitting module and a difference detection module;
    the fitting step is carried out by the polygon fitting module executing on at least one hardware processor; and
    the comparing step is carried out by the difference detection module executing on the at least one hardware processor.

8. An apparatus comprising:
    a memory; and
    at least one processor coupled to the memory and operative to perform the steps of:
    using an original design shape in the layout to be simulated by process simulation to form process simulation contours;
    fitting a polygon to the process simulation contours to form a fitted simulated shape;
    comparing the fitted simulated shape and the original design shape; and
    determining whether the fitted simulated shape violates a set of design rules in response to detecting that the fitted simulated shape differs from the original design shape, wherein the fitting step comprises generating a concave hull that characterizes the process simulation contours, fitting a plurality of rectangles to the concave hull and merging the plurality of rectangles to form the polygon.

9. The apparatus of claim 8, wherein the comparing step comprises comparing the fitted simulated shape to the original design shape utilizing a NOT or XOR Boolean operation.

10. The apparatus of claim 8, wherein the determining step comprises determining at least one of width, length, spacing, density, enclosure, or area of the fitted simulated shape.

11. The apparatus of claim 8, wherein the at least one processor is further operative to perform the step of modifying the layout if the fitted simulated shape violates the set of design rules.

12. The apparatus of claim 11, wherein the modifying step comprises modifying at least one of size, shape, or position of the original design shape.

13. The apparatus of claim 8, further comprising a plurality of distinct software modules, each of the distinct software modules being embodied on a computer-readable storage medium, and wherein the distinct software modules comprise a polygon fitting module and a difference detection module, wherein:

the at least one processor is operative to perform the fitting step by executing the polygon fitting module; and the at least one processor is operative to perform the comparing step by executing the difference detection module.

* * * * *